Feb. 15, 1966  R. D. ARTIS  3,235,337
DIAGNOSTIC COMPOSITIONS AND TEST INDICATORS
Filed Oct. 22, 1962

FIGURE 2. DIRECTION OF FLUID FLOW

INVENTOR
ROBERT D. ARTIS
BY Harry J. Stephenson
ATTORNEY

United States Patent Office 3,235,337
Patented Feb. 15, 1966

3,235,337
DIAGNOSTIC COMPOSITIONS AND TEST INDICATORS
Robert D. Artis, Cherry Hill, N.J., assignor to Miles Laboratories, Inc., Elkhart, Ind., a corporation of Indiana
Filed Oct. 22, 1962, Ser. No. 232,261
11 Claims. (Cl. 23—253)

This invention relates to improved diagnostic compositions and test indicators utilizing the same. In particular, this invention is concerned with diagnostic tests useful in qualitative detection and quantitative determination of L-amino acids in body fluids. More particularly, this invention is concerned with diagnostic test reagent compositions and test indicators comprised of said test compositions and bibulous carriers therefor.

Amino acids, the end products of protein digestion, are absorbed into the blood where they diffuse throughout the body fluids to reach the tissue cells. At the same time, tissue proteins undergo changes and release amino acids which may enter the circulatory system and thus become part of what is termed, generally, the "amino acid pool." Science has not devised a way of distinguishing between the fate of the amino acids derived from food and those derived from the tissues.

Amino acids are taken up from the "common amino acid pool" by the cells to be built into the cell structure as required. While the "amino acid pool" has no anatomical reality is represents the available amino acid building units. Thus, the pool "contains" not only the free amino acids of the blood, extra-cellular and intra-cellular fluids, but also, the amino acids freed by the tissue proteins.

If the cells take up as much amino acids as are lost, the cells are in a state of "dynamic equilibrium." If the loss is greater, the cell wastes; if the gain is greater, the cell grows. Amino acids which are not used as such are metabolized and, therefore, may undergo decarboxylation and/or deamination, i.e., the amino group is released as ammonia which is either excreted as urea or used in the synthesis of other compounds.

While minute traces of many amino acids are found in normal urine and blood, it is recognized that a build-up of L-amino acids in the blood and in the urine is indicative of certain diseases and syndromes, for example, phenylketonuria, liver malfunctions, alkaptonuria, coeliac disease, cystinurea, Wilson's disease, Fanconi syndrome, galactosemia, rickets, scurvy, etc.

Healing sciences have long recognized the usefulness of tests for L-amino acid build-up in the urine and other body fluids. Hence, it is considered extremely desirable to provide a simple and economical test for the qualitative detection and quantitative determination of L-amino acids in the urine which may be advantageously used by hospital and clinical personnel untrained in laboratory technique as well as the trained laboratory technician and physician. Because of the presence of enzyme-inhibitory anions such as sulfates and phosphates, as well as other substances in the body fluids, it has been difficult to devise a simple and accurate enzyme test specifically for L-amino acids.

A variety of reagents and techniques have been used or proposed in the past for the detection of L-amino acid build-up in the urine and blood, for example, bioassay, chromatography, and chemical analysis, all of the known and proposed methods of which are time consuming, require skilled technicians and complicated laboratory equipment.

From the commercial point of view, test compositions in the form of bibulous strips or sticks are highly preferred for the reason that such provide the diagnostician with a simple "dip and read" test. As is recognized, such simple "dip and read" tests provide many advantages over prior known liquid and tabletted reagent compositions.

In accordance with this invention, applicant has discovered a novel, simple and accurate diagnostic enzymic test composition for detecting the presence of and quantitatively determining L-amino acids in body fluids. The improved test composition is highly stable and affords positive and accurate results notwithstanding the presence of enzymic-inhibiting compounds in the fluid to be tested.

Broadly, applicant's novel test compositions comprise a substance having enzymic activity specific for L-amino acids, a substance having peroxidative activity, a color forming substance which reacts with a peroxide to form a color or undergo a color change, and an activator for said first mentioned substance. Substances having enzymic activity suitable for use in the test reagents of the present invention include, but are not limited to enzymes.

The drawing shows a two zone bibulous strip impregnated with a first zone comprising the activator in the form of a metal chloride and a second zone comprising the remainder of the test composition. The mechanism of this embodiment will be elucidated hereinafter.

FIGURE 2 is a side view of the same strip.

Figure 1:
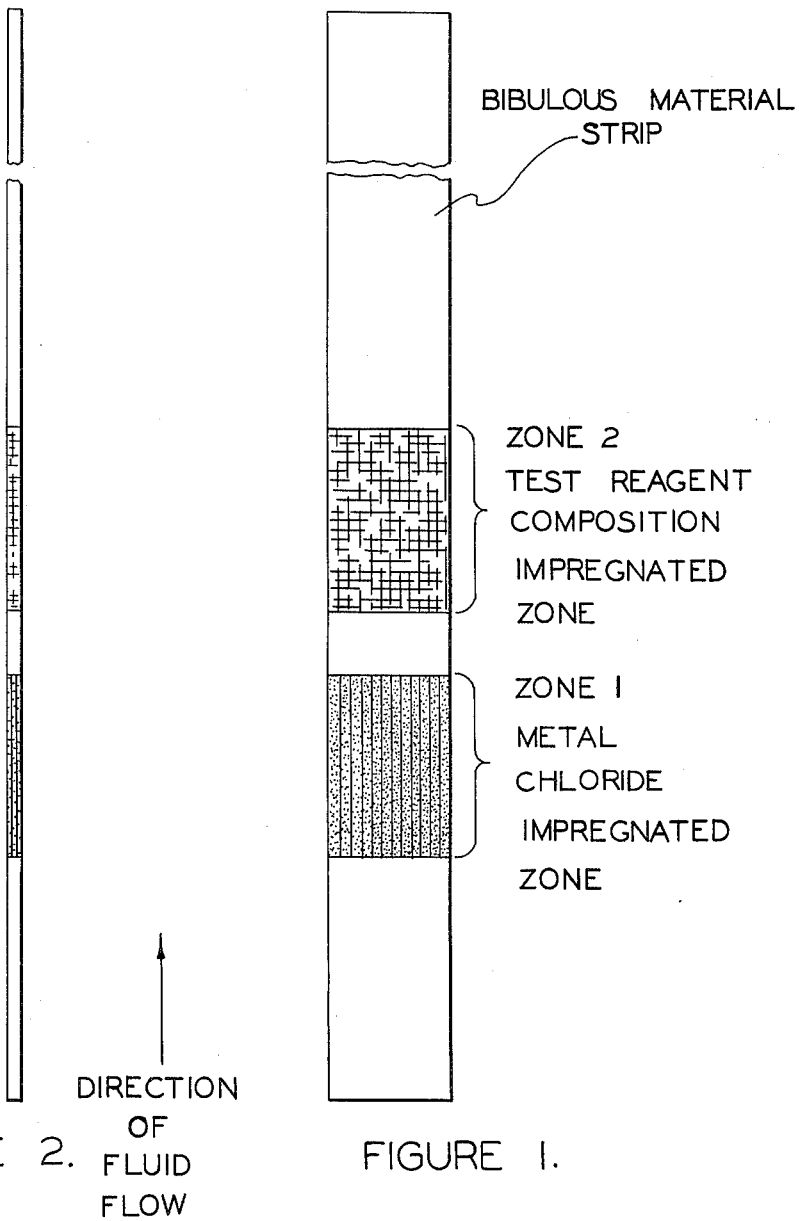
FIGURE 1 is a front view of the bibulous strip showing the two zone impregnation.

Among the known enzymes specifically active for L-amino acids and satisfactory for use in the compositions of this invention are the L-amino acid oxidases from *Crotalus adamanteus*, dried snake venom from *Agkistrodon p. piscivorus*, rat kidneys, turkey liver, microorganisms and molds, or mixtures thereof, etc. Satisfactory substances having peroxidative activity are obtained from horse-radish peroxidase, fig latex peroxidase, urohemin, blood and molybdate iodide. It is to be understood that the selection of a substance having enzymic L-amino acid activity and a substance having peroxidative activity in the novel compositions and methods of this invention is dictated solely by choice and economic considerations. For these reasons, a preferred peroxidative substance, enzymic in structure, is one derived from horse-radish and a preferred enzyme having L-amino acid oxidase activity is obtained from *Crotalus adamanteus*.

It has been theorized that the resulting basic reactions utilizing the composition and method of this invention are as follows:

$$O_2 + H_2O + \text{L-amino acid} \xrightarrow{\text{L-amino oxidase}}$$

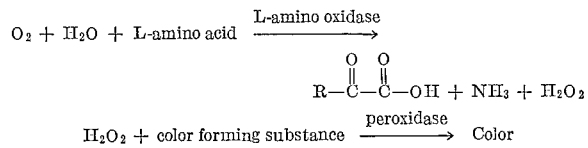

$$H_2O_2 + \text{color forming substance} \xrightarrow{\text{peroxidase}} \text{Color}$$

Although the exact mechanism is not known, it has been discovered that an enzyme activating substance must be present in the composition. While many activating substances may be used in the composition, for example, chlorides, flavin adenine dinucleotide, flavin mononucleotide, acriflavin, etc., in the preferred embodiment for economic reasons, a substance containing a chloride ion is used.

Among the color forming substances found suitable for use in the compositions and methods of this invention are tincture of guaiac, o-tolidine, 2,5-diaminotoluene·2HCl; 3,3'-dimethoxy benzidine; p-phenetidine·HCl; and pyrogallolsulfonephthalein, and mixtures thereof.

In addition to the foregoing ingredients, it has been found desirable but not essential to include such substances as buffers, thickening agents, activators, and stabilizers. In the preferred embodiment, tris(hydroxymethyl)aminomethane is used as a buffer. It is to be understood, however, that other buffers may be used in the composition of this invention to insure a proper pH environment for the enzyme system so long as the selected buffer does not exhibit a deleterious effect on the enzyme system. Generally, phosphate buffers are deleterious to enzyme systems such as the instant one, in combination with the enzyme protein. Stabilizers such as bovine albumin, gelatin and oxidized polysaccharides may be added.

In addition, where desired a wetting agent, e.g., Bis(2-ethylhexyl) sodium sulfosuccinate (Aerosol OT) may be used. Thickening agents such as algin, polyvinyl alcohol, starch, gum arabic or high molecular weight polyethylene glycol, have been found useful to increase the viscosity of the compositions so that superior and more homogeneous application of the test composition to the stick can be effected.

In preparing the diagnostic "strips" or "sticks" of this invention, the strips may be impregnated with the test reagent composition of this invention in the one-zone or two-zone impregnation discussed hereinafter, followed by a drying step after each impregnation. In the preferred embodiment, it is contemplated that a reagent-free zone be provided at the terminal end of the diagnostic strip so that in use the test fluid ascends therethrough into the impregnated area.

Another embodiment of this invention includes the impregnation of a first zone on the strip with a divalent metal chloride through which zone the liquid to be tested must ascend enroute to a second reagent zone. This latter embodiment effects a surprisingly unexpected dual result. In such a system, unwanted inhibiting ions, e.g. sulfate, phosphate, benzoate and other di- and trivalent anions, are substantially completely removed as insoluble precipitates, thereby providing additional enzyme activating chloride ions as a result of the exchange. Satisfactory chloride-containing compounds which exhibit this anti-inhibitory effect and are useful in this embodiment of the invention are barium chloride, magnesium chloride, calcium chloride, cadmium chloride, strontium chloride and lead chloride. The selection of a suitable chloride-containing compound depends upon its ability to remove interfering substances as insoluble precipitates without deleteriously affecting the enzyme system.

The following examples will illustrate the improved diagnostic compositions of the present invention, without limiting the scope of the invention to the specific details of these examples:

PREPARATION OF THE IMPREGNATING SOLUTIONS

A buffer-activating solution was first prepared comprising 20 ml. of 0.1 M tris(hydroxymethyl)aminomethane containing 0.1 M KCl, which solution was adjusted to a pH of about 6.5 to 7.5 with HCl.

To 20 ml. portions of this buffering-activating solution was added and mixed the enzyme-containing compositions as set out in the following formulae:

Formula 1

| | | |
|---|---|---|
| Horse-radish peroxidase | mg | 30 |
| Bovine serum albumin | mg | 200 |
| L-amino acid oxidase (from *Crotalus adamanteus*) | mg | 50 |
| 1% aqueous solution of algin | ml | 1 |
| 95% ethyl alcohol containing 20 mg. o-tolidine (free base) | ml | 10 |

Formula 2

| | | |
|---|---|---|
| Horse-radish peroxidase | mg | 30 |
| Bovine serum albumin | mg | 200 |
| L-amino acid oxidase (from *Crotalus adamanteus*) | mg | 50 |
| 1% aqueous solution of algin | ml | 1 |
| Tincture of guaiac | ml | 0.1 |

Formula 3

| | | |
|---|---|---|
| Horse-radish peroxidase | mg | 40 |
| Bovine serum albumin | mg | 50 |
| 70% Aerosol OT | mg | 20 |
| Tincture of guaiac | ml | 4 |
| 95% ethanol containing 15 mg. o-tolidine (free base) | ml | 3 |
| L-amino oxidase (from *Crotalus adamanteus*) | mg | 8 |

Formula 4

| | | |
|---|---|---|
| Horse-radish peroxidase | mg | 40 |
| Bovine serum albumin | mg | 50 |
| 70% Aerosol OT | mg | 20 |
| Tincture of guaiac | ml | 4 |
| 95% ethanol containing 15 mg. o-tolidine (free base) | ml | 3 |
| L-amino oxidase (from *Crotalus adamanteus*) | mg | 16 |

Additional reagent compositions were prepared as above utilizing the following color indicators instead of the o-tolidine and guaiac of Formulae 1–4: 2,5-diaminotoluene·2HCl; 3,3'-dimethyoxybenzidine; p-phenetidine. HCl; and pyrogallolsulfonephthalein.

When using an indicator which is only sightly soluble in the aqueous enzyme-containing formula, it may be desirable to use a two-step procedure whereby the impregnation procedure is duplicated. In this instance a first solution is employed from which the color indicator is omitted. A second solution is then prepared which incorporates the color indicator dissolved in acetone.

PREPARATION OF REAGENT STRIPS

Bibulous strips of absorbent paper are cut into narrow strips having dimensions of about 5 mm. x 60 mm. x 0.4 mm. and are impregnated with the test reagent solution by dipping, rolling or other suitable means. The strips are then dried in a drying tunnel for 8 minutes at 100° C. When utilizing an impregnating solution comprising a water insoluble color indicator, the strips are first impregnated with the test reagent formula prepared without a color indicator, followed by drying the strips in a drying tunnel for 8 minutes at 100° C. After drying, the strips are similarly impregnated with an acetone solution of the desired color indicator and dried at room temperature for about 5 minutes in open air. By either method, the resulting impregnated strips are a light buff color.

Reagent strips may be additionally prepared as follows: Bibulous strips of similar dimensions as above are prepared having at their free end a first zone about 20 mm. long impregnated with a solution of a divalent chloride, for example, barium chloride, calcium chloride, magnesium chloride, cadmium chloride or strontium chloride. While the amount of divalent metal chloride deposited in this zone is not critical, it has been found that depositing about 2 mg. to 5 mg. of the selected chloride is sufficient to substantially completely remove or to negate any adverse effect of any inhibitory anions present in the body fluid being tested. These strips are then dried as described above.

A second zone is then impregnated with the test reagent composition which comprises the enzyme, buffer and color indicator. This zone is immediately adjacent to and directly above the first zone. The test reagent composition is applied by a rolling device which narrowly confines the solution within this prescribed zone. A similar drying procedure is used as described above.

In still another form of the invention, reagent strips are prepared as last above described, except that the first zone is left reagent-free instead of being impregnated with the inhibitor-precipitating chlorides.

PROCEDURE FOR TESTING

In use, an impregnated diagnostic strip or a test indicator prepared as described above is dipped into the test fluid. Only the terminal end of the strip is immersed in the liquid specimen which ascends into the impregnated zone or zones. When the impregnated diagnostic strip is contacted with a body fluid containing L-amino acid or acids, a positive color reaction is effected in the test reagent zone.

The quantitative determination of the amount of L-amino acid present in the test sample is effected by correlating the resultant color on the strip to a color chart wherein the various color hues are indicative of different ranges of L-amino acid. Variations of color intensity on the strip are dependent upon the amounts and types of amino acids present.

The invention thus provides a novel diagnostic aid for the qualitative detection and quantitative determination of L-amino acids in body fluids completely or substantially removing inhibitory anions which heretofore have prevented a simple, accurate enzyme test for L-amino acids in body fluids.

If desired, inhibitory anions may be removed by passing the suspect body fluid through a column of anion exchange resin. One convenient method for accomplishing this removal is by aspirating a small amount of the suspect fluid into a medicine dropper containing the ion exchange resin and then expelling a drop of said fluid, from which the interfering anions have been removed, onto a strip of absorbent paper impregnated as above described.

In another embodiment of this invention, the various diagnostic reagents may be incorporated into an ion exchange resin column such as by impregnating the reagents onto cellulose fibers placed above the ion exchange resin column. In another embodiment, cellulosic ion exchange fibers may serve both as a carrier for the reagents utilized in the diagnostic reaction and as a means for removing inhibitory anions. It is also to be understood that other bibulous materials, e.g. small sticks of wood, etc. may be used as well as employing other methods for impregnating solutions into the test materials and subsequently drying said materials.

It will be recognized that certain changes and modifications may be made in the above compositions and methods without departing from the spirit and scope of the invention and appended claims, and it is intended that all matter contained in the foregoing description shall be interpreted as illustrative and not in a limiting sense.

What is claimed is:

1. A diagnostic composition for the detection of L-amino acids in fluids containing anions which inhibit L-amino acid oxidase activity which comprises L-amino acid oxidase,
   a substance having peroxidative activity,
   a color indicator which is responsive in the presence of hydrogen peroxide and the material having peroxidative activity, and
   as an activator for said L-amino acid oxidase, a metal chloride selected from the group consisting of potassium chloride, barium chloride, magnesium chloride, calcium chloride, cadmium chloride, strontium chloride and lead chloride.

2. A test device for detecting L-amino acids in fluids containing anions which inhibit L-amino acid oxidase activity comprising a bibulous carrier impregnated with the composition of claim 1.

3. The test device of claim 2 wherein said color indicator is selected from the group consisting of o-tolidine, guaiac, 2,5-diaminotoluene·2HCl, 3,3′-dimethoxybenzidine, p-phenetidine·HCl and mixtures thereof.

4. A test device for detecting L-amino acids in fluids containing anions which inhibit L-amino acid oxidase activity which comprises a bibulous material containing therein a first zone impregnated with a divalent metal chloride selected from the group consisting of barium chloride, magnesium chloride, calcium chloride, cadmium chloride, strontium chloride and lead chloride; and immediately adjacent thereto, a second zone impregnated with a composition comprising
   L-amino acid oxidase,
   a substance having peroxidative activity, and
   a color indicator which is responsive in the presence of hydrogen peroxide and the material having peroxidative activity.

5. The test device of claim 4 wherein the color indicator is selected from the group consisting of o-tolidine, guaiac, 2,5-diaminotoluene·2HCl, 3,3′-dimethoxybenzidine, p-phenetidine·HCl and mixtures thereof.

6. The test device of claim 4 wherein the second zone composition additionally comprises potassium chloride.

7. The diagnostic composition of claim 1 wherein the substance having peroxidative activity is peroxidase.

8. The diagnostic composition of claim 1 wherein the color indicator is selected from the group consisting of o-tolidine, guaiac, 2,5-diaminotoluene·2HCl, 3,3′-dimethoxybenzidine, p-phenetidine·HCl and mixtures thereof.

9. The diagnostic composition of claim 1 wherein the activator is potassium chloride.

10. A diagnostic test indicator as described in claim 2 wherein the substance having peroxidative activity is peroxidase.

11. A diagnostic indicator as described in claim 4 wherein the substance having peroxidative activity is peroxidase.

References Cited by the Examiner

UNITED STATES PATENTS

| | | | |
|---|---|---|---|
| 2,848,308 | 8/1958 | Free | 23—253 |
| 2,981,606 | 4/1961 | Keston. | |
| 3,069,330 | 12/1962 | Babson. | |
| 3,099,605 | 7/1963 | Free | 23—253 XR |

OTHER REFERENCES

Hawk et al., Practical Physiological Chemistry, pp. 310–314, 13th ed., 1954, QP 514 H4.

MORRIS O. WOLK, *Primary Examiner.*